US010482393B2

(12) United States Patent
Shyshkov et al.

(10) Patent No.: US 10,482,393 B2
(45) Date of Patent: Nov. 19, 2019

(54) MACHINE-BASED LEARNING SYSTEMS, METHODS, AND APPARATUS FOR INTERACTIVELY MAPPING RAW DATA OBJECTS TO RECOGNIZED DATA OBJECTS

(71) Applicant: The Travelers Indemnity Company, Hartford, CT (US)

(72) Inventors: Alex A. Shyshkov, Roxbury, CT (US); Sarasaleka Devasenan, South Windsor, CT (US)

(73) Assignee: The Travelers Indemnity Company, Hartford, CT (US)

( * ) Notice: Subject to any disclaimer, the term of this patent is extended or adjusted under 35 U.S.C. 154(b) by 217 days.

(21) Appl. No.: 15/591,610

(22) Filed: May 10, 2017

(65) Prior Publication Data

US 2018/0330206 A1 Nov. 15, 2018

(51) Int. Cl.
| | |
|---|---|
| *G06N 20/00* | (2019.01) |
| *G06F 16/583* | (2019.01) |
| *G06K 9/00* | (2006.01) |
| *G06K 9/62* | (2006.01) |
| *G06F 17/27* | (2006.01) |

(52) U.S. Cl.
CPC .......... *G06N 20/00* (2019.01); *G06F 16/583* (2019.01); *G06K 9/00456* (2013.01); *G06K 9/6271* (2013.01); *G06F 17/2705* (2013.01); *G06K 2209/27* (2013.01)

(58) Field of Classification Search
CPC .... G06K 9/00979; G06K 9/66; G06K 9/6289; G06K 9/6267; G06K 2209/27; G06F 16/583; G06F 17/2705
USPC ......................................................... 382/159
See application file for complete search history.

(56) References Cited

U.S. PATENT DOCUMENTS

| | | | | |
|---|---|---|---|---|
| 8,577,915 | B2* | 11/2013 | Barve ................... | G06F 16/951 707/769 |
| 8,903,812 | B1* | 12/2014 | Chen ....................... | G06F 16/78 707/723 |
| 9,407,809 | B2* | 8/2016 | Ramachandran .. | H04N 5/23206 |
| 2008/0306924 | A1* | 12/2008 | Paolini ................... | G06F 16/48 |
| 2018/0307687 | A1* | 10/2018 | Natkin .................... | H04L 67/22 |

* cited by examiner

*Primary Examiner* — Daniel G Mariam
(74) *Attorney, Agent, or Firm* — Michael D. Downs; Fincham Downs LLC

(57) ABSTRACT

Systems, apparatus, methods, and articles of manufacture provide for analysis of raw data and conversion of the raw data to searchable data objects. In one embodiment, a formatted searchable data object is generated in a first interface portion of a user interface in conjunction with the corresponding raw data displayed in a second interface portion of the user interface.

18 Claims, 10 Drawing Sheets

MACHINE-BASED LEARNING SYSTEMS, METHODS, AND APPARATUS FOR INTERACTIVELY MAPPING RAW DATA OBJECTS TO RECOGNIZED DATA OBJECTS

TECHNICAL FIELD OF THE INVENTION

The present disclosure relates to systems, methods, and apparatus for processing images of objects and audio recordings, recognizing information in the processed images and recordings, and generating interactive interface layouts mapping raw data to recognized data objects.

BACKGROUND

Content recognition systems are known for identifying objects in electronic images (e.g., in digital photographs, in digital images of paper documents, etc.) and for recognizing information in recorded audio files. Despite improvements in such content recognition technology, it is necessary to review the original image or audio files and other types of raw data to verify the accuracy of the recognition systems. However, despite the importance of maintaining and verifying the raw data, prior systems have failed to provide an effective technical implementation that associates and presents the raw data in a manner that simplifies verification or correction of the recognized information.

BRIEF DESCRIPTION OF THE DRAWINGS

An understanding of embodiments described in this disclosure and many of the related advantages may be readily obtained by reference to the following detailed description when considered with the accompanying drawings, of which.

DETAILED DESCRIPTION

Figure 1:
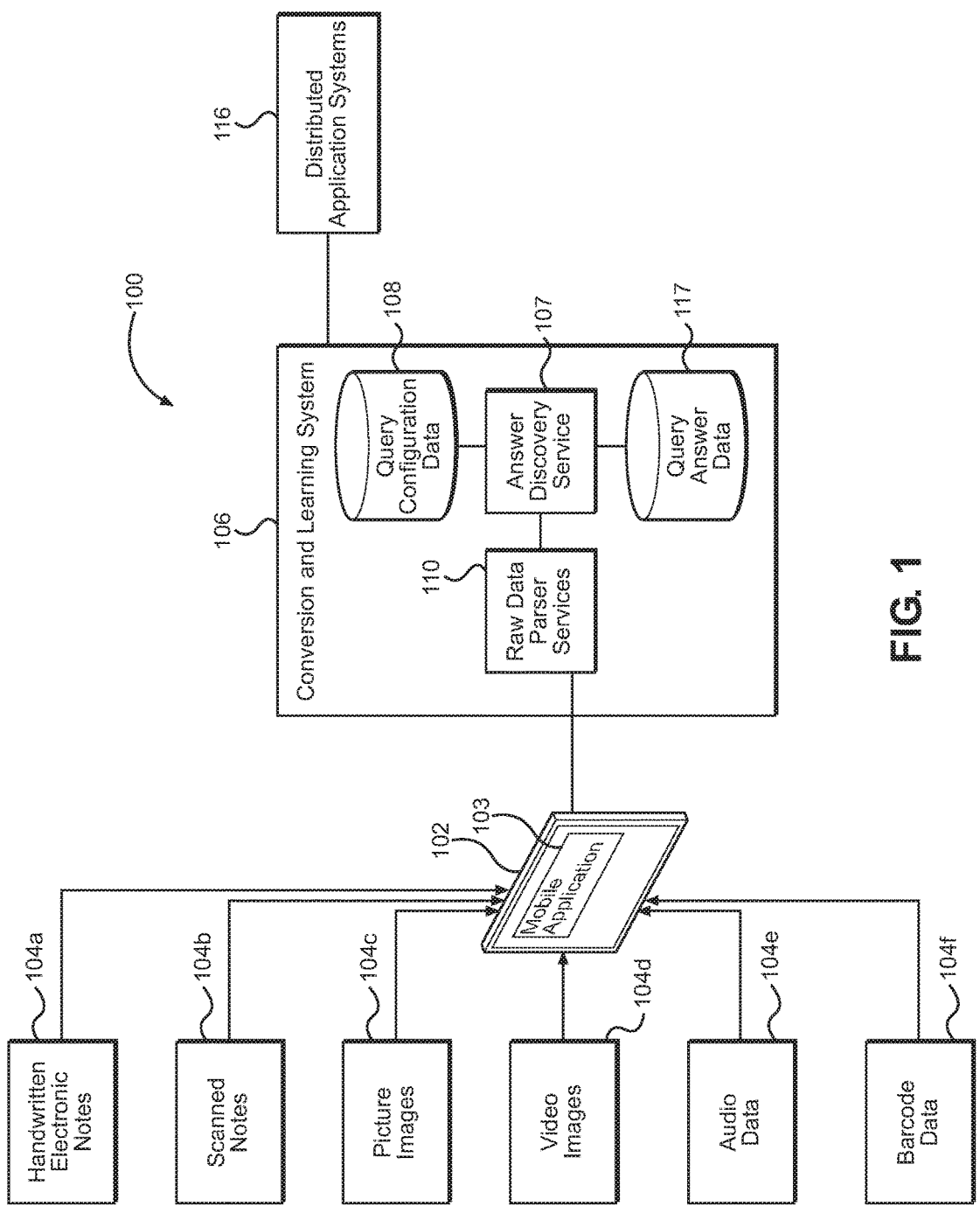
FIG. 1 is a diagram of a system according to an embodiment of the present invention.

The systems, methods, and apparatus of the present disclosure may provide, among other features, interactive data object mapping capabilities in which image files, audio files, barcodes, and other types of raw data are efficiently processed for content recognition and presented to a user on an interactive interface. In some embodiments, an interactive data object mapping system (also referred to as an interactive form system) may enable recognition of various objects, features, and/or other types of information from raw data (e.g., captured by a user), and may enable generation of an interactive interface mapping raw data objects to recognized information. In some embodiments, a first frame or other display portion may be displayed to the user, the first frame including a representation of respective information recognized from one or more raw data objects. In some embodiments, a second frame or other display portion may be displayed to a user, the second frame including a representation of the one or more raw data objects (e.g., captured by a user using a mobile device), and the appearance of a raw data object in the first frame may be mapped to or otherwise related visually to indicate a correspondence between the raw data object and the recognized information. In one example, the recognized information may be aligned horizontally or vertically with a corresponding raw data object. In another example, the representation of recognized information may relate visually to the representation of the corresponding raw data object by using the same background color, texture, and/or highlighting. In another example, a line or other type of visual link may be generated to connect visually the recognized information and its corresponding raw data object on a displayed interface.

In one or more embodiments, when a user rolls a selection pointer over or selects a displayed raw data object in a second frame, the interactive interface refreshes or adjusts the content of a first frame so that the corresponding information recognized from the displayed raw data object is displayed in association with the raw data object. In one embodiment, adjusting the content of the first frame comprises displaying the corresponding recognized information in the first frame. In one embodiment, in which the first frame and the second frame are horizontally adjacent, adjusting the content of the first frame comprises displaying the corresponding recognized information substantially horizontally with the raw data object.

In one or more embodiments, when a user rolls a selection pointer over or selects displayed recognized information in a first frame (e.g., a form presenting static or editable information recognized from a raw data object), the interactive interface refreshes or adjusts the content of a second frame so that the corresponding raw data object is displayed in association with the displayed recognized information. In one embodiment, adjusting the content of the second frame comprises displaying the corresponding raw data object in the second frame. In one embodiment, in which the first frame and the second frame are horizontally adjacent, adjusting the content of the second frame comprises displaying the corresponding raw data object substantially horizontally with the recognized information.

In one or more embodiments, when a user rolls a selection pointer over or selects a displayed raw data object or its corresponding recognized information, the interactive interface displays a line or other type of visual link between the two, and/or highlights both the raw data object and its corresponding recognized information to indicate that the two displayed items are related.

Various aspects of the present disclosure may enable a user to perform keyword searches against recognized information and/or raw data objects.

In accordance with some embodiments of the present invention, one or more systems, apparatus, methods, articles of manufacture, and/or computer readable media (e.g., non-transitory computer readable memory storing instructions for directing a processor) provide for one or more of:

a) receiving raw data (e.g., from a computerized mobile device);

b) converting the raw data into text;

c) determining a query configuration; and/or
d) matching at least a portion of the text to at least one query based on the query configuration.

In accordance with some embodiments of the present invention, one or more systems, apparatus, methods, articles of manufacture, and/or computer readable media (e.g., non-transitory computer readable memory storing instructions for directing a processor) provide for one or more of:
a) acquiring raw data via a data capture device;
b) converting raw data to at least one searchable data object;
c) selecting a predefined data query object (DQO) based on a searchable data object (SDO);
d) formatting the SDO based on the selected DQO;
e) storing the formatted SDO in association with the DQO;
f) generating a first interface portion including the formatted SDO; and/or
g) generating a second interface portion including raw data from which the formatted SDO was converted.

Throughout the description that follows and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting.

As used in this disclosure, the term "raw data" or "raw data object" refers to data or information in the form in which it is received by a system for recognizing content in the raw data and/or received by a system controlling a content recognition system. Data received by such a system may be referred to as "raw data" even if it has undergone some type of pre-processing prior to being received by the system. In some embodiments, raw data may include but is not limited to image files, video files, audio files, barcode files, digital images of scanned physical documents, and electronic handwriting files.

As used in this disclosure, the term "image" refers to a visual representation of an object or scene (e.g., including more than one object). An image may include photographs, digital scans of physical papers or objects, video files, drawings, and the like. The terms "digital image" or "electronic image file" may be used synonymously in this disclosure, and refer to images that are electronically transmissible, computer- or machine-readable, and/or computer- or machine-storable (e.g., one or more electronic files storing a digital image).

FIG. 1 is a diagram illustrating one or more embodiments of the present invention. More specifically, FIG. 1 shows an example system 100 for acquiring and converting the raw data to generate recognized information based on data query objects. Specifically, the system 100 may provide for determining raw data about objects, properties, people, etc., converting the raw data into at least one searchable data object, and matching at least one data query object to the at least one searchable data object. In some embodiments, the system may further provide for generating an interactive user interface displaying raw data objects and corresponding recognized information.

As shown in FIG. 1, the system 100 may comprise a mobile device 102 (e.g., a tablet computer, a smartphone, or other type of portable computing device) in communication with a conversion and learning system 106, which may be in communication with one or more distributed application systems 116.

As shown in FIG. 1, the mobile device 102 may store and/or execute one or more types of mobile applications 103 (e.g., software applications executed by a processor) for receiving and processing various types of information, including, but not limited to, handwritten electronic notes 104a, scanned notes 104b, picture images 104c, video images 104d, audio data 104e, and barcode data 104f.

In some embodiments, the mobile device 102 may be operated by a user located at a location (e.g., an office building, a park) who wants to input handwritten notes, image files, audio recordings, barcodes, and other types of raw data, for identification and/or classification of various types of objects, features, and/or other types of information collected at or about the location. In some embodiments, the user may be able to add, modify, or delete raw data and/or classification information via the mobile device 102.

The mobile device 102 may, for example, comprise one or more personal computer (PC) devices, computer workstations (e.g., underwriter workstations), tablet computers such as an iPad® manufactured by Apple®, Inc. of Cupertino, Calif., and/or cellular and/or wireless telephones such as an iPhone® (also manufactured by Apple®, Inc.) or a G4™ smart phone manufactured by LG® Electronics, Inc. of San Diego, Calif., and running the Android® operating system from Google®, Inc. of Mountain View, Calif.

As shown in FIG. 1, the conversion and learning system 106 (which may be remote from the mobile device 102) may comprise query configuration data 108 and raw data parser services 110 (e.g., a web-based service implemented using SoapUI™ by SmartBear, TomEE+™ by Apache, Eclipse™ by The Eclipse Foundation, or the like). According to some embodiments, the raw data parser services 110 receive a request from the answer discovery service 107 (e.g., a request initiated by a user after raw data is received from the mobile device 102) to identify content in stored raw data and/or to convert raw data into searchable objects and parse the raw data to recognize information in the raw data based on the stored query configuration data 108. According to some embodiments, the raw data parser services 110 receive a request from the mobile device 102 (e.g., via the answer discovery service 107) to identify content in raw data and/or convert raw data into searchable objects (e.g., the request including one or more types of raw data 104a, 104b, 104c, 104d, 104e, and/or 104f from the mobile device 102) and parse the raw data to recognize information in the raw data and create searchable data objects based on the stored query configuration data 108.

The raw data parser services 110 may, for example, determine specific information associated with one or more objects, and/or with one or more features or characteristics of a first location (e.g., from which the mobile device 102 is in communication with the conversion and learning system 106). Classifying or otherwise recognizing content may comprise image recognition, audio recognition, handwriting recognition, electronic ink conversion, and/or barcode decoding to identify objects in images or audio files. Some additional details about objects and object classification are discussed in this disclosure.

In some embodiments, the answer discovery service 107 stores searchable data objects in association with corresponding queries in query answer data 117 based on the query configuration data 108. In various embodiments, the query configuration data 108 comprises a plurality of predefined query data objects. Each predefined query data object stores respective criteria for associating information recognized by the raw data parser services 110 with the query data object. For example, the raw data parser services 110 may parse a raw data image file received from mobile device 102, identify an object in the raw data image file, and derive corresponding description text, tags, and/or keywords descriptive of the identified object. Query configuration data 108 may comprise predefined criteria that inform the answer discovery service 107 what to do if certain information is recognized by the raw data parser services 110 from the raw data. For example, if a certain keyword is identified for an image file, the answer discovery service 107 may associate that keyword with one or more form fields defined by a query data object defined in query configuration data 108, and store the keyword (and/or related recognized information) in association with those form fields in query answer data 117.

In some embodiments, the conversion and learning system 106 may comprise an electronic and/or computerized controller device (not shown in FIG. 1), such as a computer server communicatively coupled to interface with at least one mobile device (e.g., mobile device 102) and/or one or more distributed application systems 116 (directly and/or indirectly). The conversion and learning system 106 may, for example, comprise one or more PowerEdge™ M910 blade servers manufactured by Dell®, Inc. of Round Rock, Tex., which may include one or more Eight-Core Intel® Xeon® 7500 Series electronic processing devices. According to some embodiments, as described in this disclosure, the conversion and learning system 106 may be located remotely from one or more mobile devices. The conversion and learning system 106 may also or alternatively comprise a plurality of electronic processing devices located at one or more various sites and/or locations.

According to some embodiments, the answer discovery service 107 and/or the raw data parser services 110 may store and/or execute specially-programmed instructions to operate in accordance with embodiments described in this disclosure. According to some embodiments, the conversion and learning system 106 may comprise a computerized processing device, such as a PC, laptop computer, computer server, and/or other electronic device to store query configuration data 108, answer discovery service 107, query answer data 117, and the raw data parser services 110 and to execute the answer discovery service 107 and/or the raw data parser services 110 (e.g., on request of a user) to manage and/or facilitate the processing of raw data from the mobile device 102.

As explained in more detail below with respect to some embodiments, query configuration data 108 may comprise information about one or more values, properties, characteristics, objects, information tags, descriptive text, and/or keywords that may be useful, in accordance with some embodiments, for associating information recognized in raw data files with predefined queries and/or generated queries (e.g., queries based on a keyword search).

Any or all of the devices depicted in FIG. 1 may be in communication via one or more electronic communication networks. A network may, according to some embodiments, comprise a local area network (LAN; wireless and/or wired), cellular telephone, Bluetooth®, and/or radio frequency (RF) network with communication links between the mobile device 102, the conversion and learning system 106, and/or the distributed application systems 116. In some embodiments, a network may comprise direct communications links between any or all of the components of the system 100. In some embodiments, the network may comprise one or many other links or network components allowing for communication among the devices depicted in FIG. 1.

The mobile device 102 may, for example, be connected to the conversion and learning system 106 via various cell towers, routers, repeaters, ports, switches, and/or other network components that comprise the Internet and/or a cellular telephone (and/or public switched telephone network (PSTN)) network, and which comprise portions of an electronic communication network. A communications network may comprise any number, type, and/or configuration of networks that is or becomes known or practicable. According to some embodiments, a network may comprise a conglomeration of different sub-networks and/or network components interconnected, directly or indirectly, by the components of the system 100. The network may comprise one or more cellular telephone networks with communication links between the mobile device 102 and the conversion and learning system 106, for example, and/or may comprise the Internet, with communication links between the conversion and learning system and the distributed application systems 116, for example.

Figure 2:
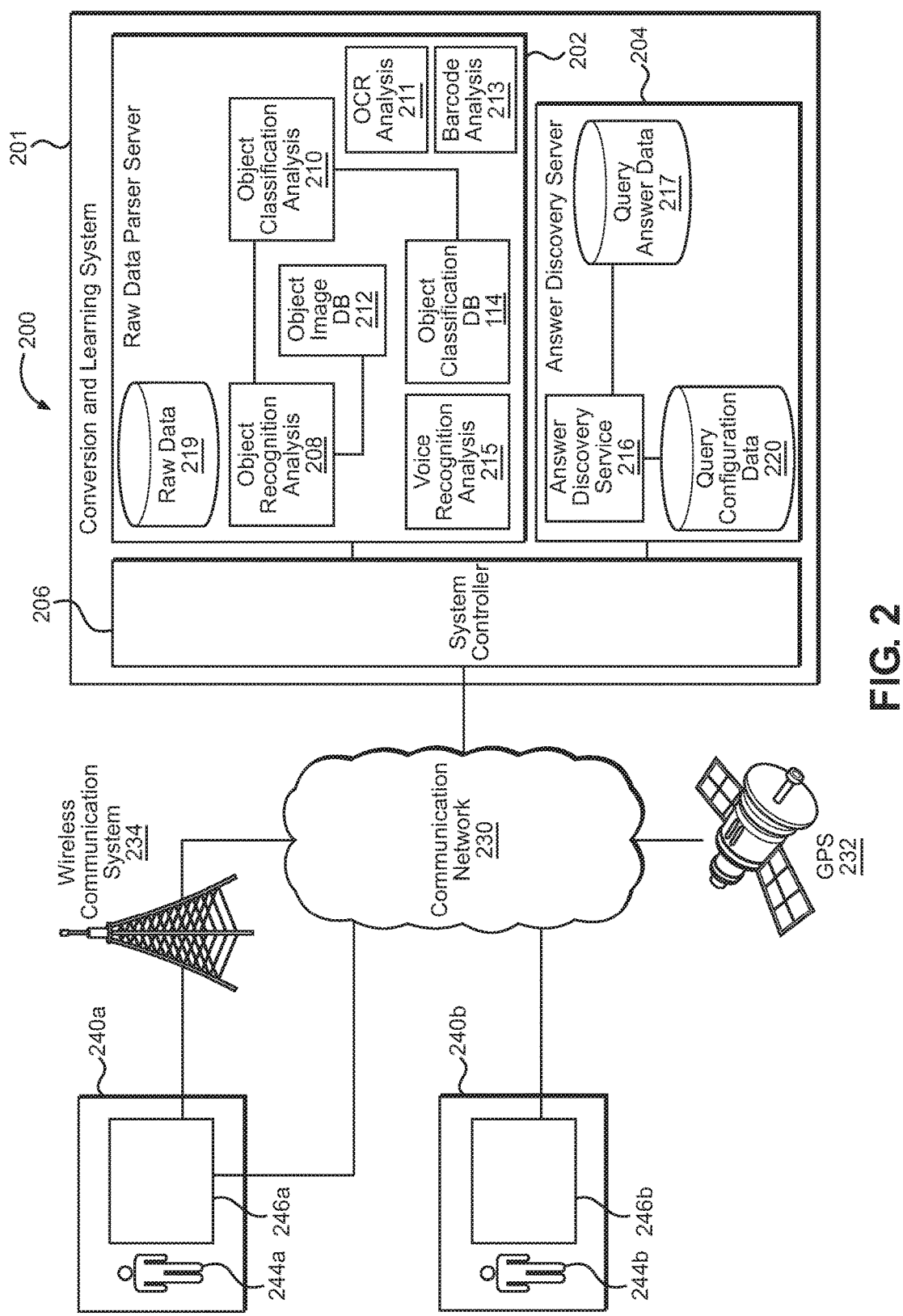
FIG. 2 is a diagram of a system according to an embodiment of the present invention.

FIG. 2 is a diagram illustrating one or more embodiments of the present invention. More specifically, FIG. 2 shows another example system 200 for collecting, converting, and learning from raw data. Specifically, the system 200 may provide for acquiring and converting the raw data to generate recognized information based on data query objects. Specifically, the system 200 may provide for determining raw data about objects, properties, people, etc., converting the raw data into at least one searchable data object (e.g., using one or more parser services), and matching at least one data query object to the at least one searchable data object. In some embodiments, the system may further provide for generating an interactive user interface displaying raw data objects and corresponding recognized information.

As shown in FIG. 2, the system 200 may comprise a first location 240a and a second location 240b. As depicted in FIG. 2, a respective user 244a, 244b is at each location with a respective mobile device 246a, 246b. Each of the mobile devices 246a, 246b is in communication with a conversion and learning system 201, which comprises a raw data parser server 202, an answer discovery server 204, and a system controller 206.

Any two or more of the various devices depicted in system 200 may be in communication with each other via at least one of communication network 230 and wireless communication system 234. As also depicted in FIG. 2, GPS 232 may provide geographical location information to the mobile devices 246a, 246b, wireless communication system 234, and/or one or more portions of conversion and learning system 201.

According to some embodiments, the raw data parser server 202 may comprise one or more different types of raw data parsers configured for parsing various types of raw data. For example, raw data parser server 202 may comprise, without limitation, a video analysis parser, an image analysis parser, an electronic handwriting parser, an optical character recognition (OCR) parser, a voice recognition parser, and/or a barcode parser. As shown in FIG. 2, the raw data parser server 202 may comprise image recognition analysis instructions 208 for conducting an image recognition analysis of images, object image DB 212 (e.g., containing stored object image data for comparing with images received from mobile devices 246a, 246b), object classification analysis instructions 210, and object classification DB 214. Object classification analysis instructions 210 may store instructions for classifying and/or determining classification information (e.g., object type information, object valuation information) for one or more objects, based on the object classification DB 214 (e.g., containing stored historical object classification data for a plurality of previously classified objects).

As shown in FIG. 2, the raw data parser server 202 may comprise OCR analysis instructions 211 for conducting optical character recognition (OCR) analysis of images. Accordingly, the raw data parser server 202 may be configured to derive text information from raw data image files (e.g., JPG format files) and other types of image files (e.g., images of physical documents in portable document format (PDF)).

As shown in FIG. 2, the raw data parser server 202 may comprise barcode analysis instructions 213 for recognizing and decoding barcodes (e.g., Universal Product Code (UPC) codes, QR codes, barcodes for physical file tracking, etc.) in raw data files. In one example, the barcode analysis instructions 213 may be in communication with a barcode database (not shown) storing information in association with respective barcodes. When a barcode is recognized, the barcode analysis instructions 213 may direct the raw data parser server 202 to access the information in the barcode database that corresponds to the recognized barcode. The raw data parser server 202 may comprise voice recognition analysis instructions 215 for converting speech in audio files to text.

As shown in FIG. 2, the answer discovery server 204 may comprise answer discovery service instructions 216 for receiving raw data from one or more remote computing devices (e.g., mobile devices 246a, 246b), transmitting raw data to the raw data parser server 202, receiving converted raw data from the raw data parser server 202 in the form of searchable data objects, determining one or more query configurations from query configuration data 220, selecting a predefined data query object based on a searchable data object, formatting the searchable data object based on the selected data query object, storing the formatted searchable data object in query answer data 217 (e.g., for use in displaying via an interactive user interface), and/or generating one or more interface portions for facilitating comparison of raw data to formatted searchable data objects.

Figure 3:
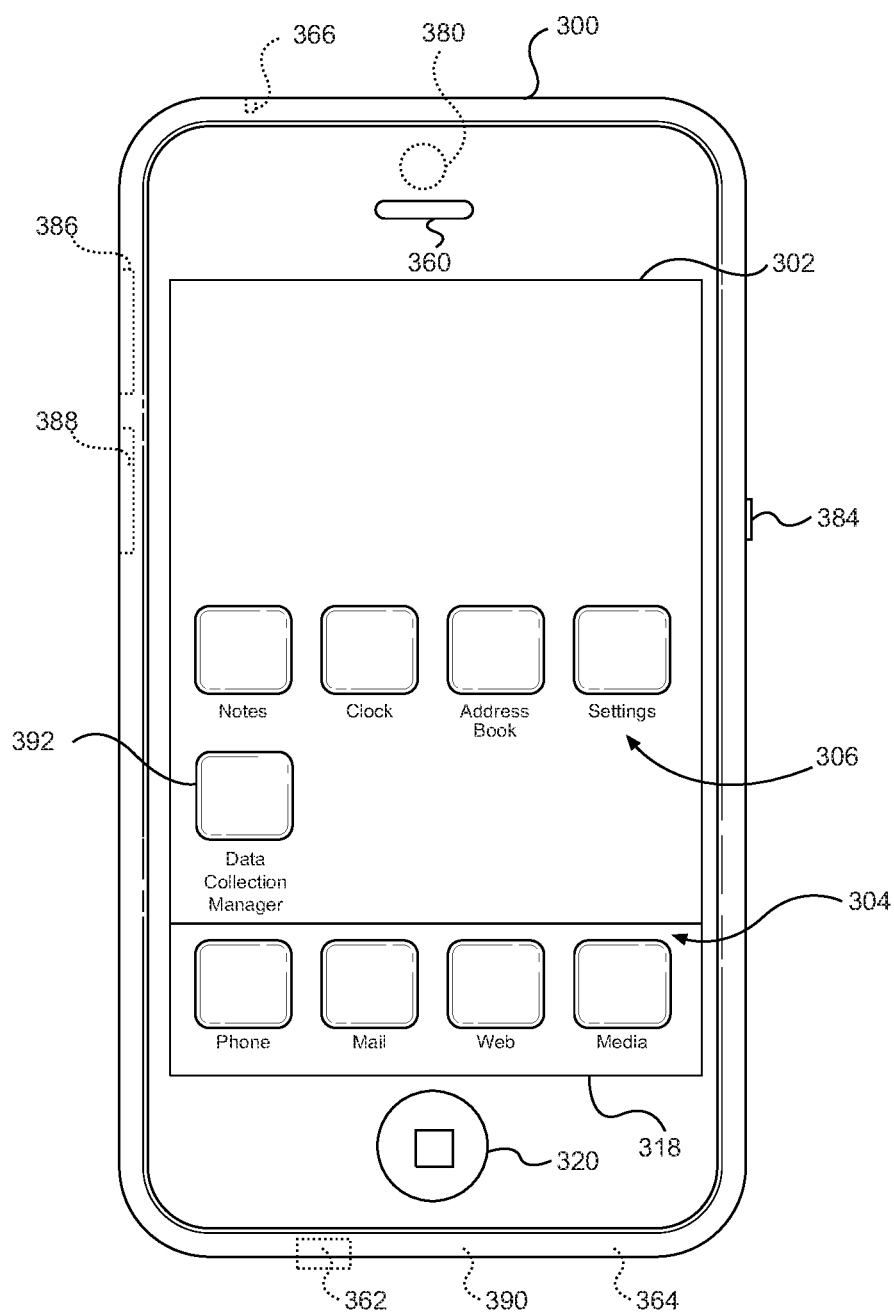
FIG. 3 is a diagram of a mobile device according to an embodiment of the present invention.

Turning to FIG. 3, a block diagram of an example mobile device 300 according to some embodiments is shown. In some embodiments, the mobile device 300 comprises a display 302. The display may be implemented with liquid crystal display (LCD) technology, light emitting polymer display (LPD) technology, or some other display technology. The display 302 may be a touch-sensitive display that is sensitive to haptic contact and/or tactile contact by a user. Alternately or in addition, other touch-sensitive display technologies may be used, such as, without limitation, a display in which contact is made using a stylus or other pointing device.

In some embodiments, the mobile device 300 may be adapted to display one or more graphical user interfaces on a display (e.g., display 302) for providing the user access to various system objects and/or for conveying information to the user. In some embodiments, the graphical user interface may include one or more display objects 304, such as icons or other graphic representations of respective system objects. Some examples of system objects include, without limitation, device functions, applications, windows, files, alerts, events, or other identifiable system objects.

In some embodiments, the mobile device 300 can implement multiple device functionalities, such as a telephony device, an email device, a network data communication device, a Wi-Fi base station device, and a media processing device. In some embodiments, display objects 304 can be displayed in a menu bar 318. In some embodiments, device functionalities can be accessed from a top-level graphical user interface, such as the graphical user interface illustrated in FIG. 3. Touching one of the display objects can, for example, invoke corresponding functionality. For example, touching a display object for an email application would invoke the email application on the mobile device 300 for sending email messages.

In some embodiments, upon invocation of device functionality, the graphical user interface of the mobile device 300 changes, or is augmented or replaced with another user interface or user interface elements, to facilitate user access to functions associated with the corresponding device functionality. For example, in response to a user touching a phone object, the graphical user interface of the display 302 may present display objects related to various phone functions. Likewise, touching of an email object may cause the graphical user interface to present display objects related to various email functions; touching a Web object may cause the graphical user interface to present display objects related to various Web-surfing functions; and touching a media player object may cause the graphical user interface to present display objects related to various media processing functions. In some embodiments, the top-level graphical user interface environment or state of FIG. 3 can be restored by pressing a button 320 of the mobile device 300.

In some embodiments, the top-level graphical user interface may include display objects 306, such as a notes object, a clock object, an address book object, a settings object, and/or one or more types of display objects having corresponding respective object environments and functionality. Touching the example "Data Collection Manager" object 392 may, for example, invoke a raw data acquisition environment (e.g., for facilitating the capturing of audio, video, barcode and/or handwriting information), and supporting functionality, as described in this disclosure with respect to various embodiments. A selection of any of the display objects may invoke a corresponding object environment and functionality.

In some embodiments, the mobile device 300 can include one or more input/output (I/O) devices and/or sensor devices. For example, a speaker 360 and a microphone 362 can be included to facilitate voice-enabled functionalities, such as phone, voicemail, or recorded audio functions. In some embodiments, an up/down button 384 for volume control of the speaker 360 and the microphone 362 can be included. In some embodiments, a loudspeaker 364 can be included to facilitate hands-free voice functionalities, such as speaker phone functions. An audio jack 366 can also be included for use of headphones and/or a microphone.

In some embodiments, the mobile device 300 may include circuitry and sensors for supporting a location determining capability, such as that provided by the global positioning system (GPS) or other positioning systems (e.g., systems using Wi-Fi access points, television signals, cellular grids, uniform resource locators (URLs)). In some embodiments, a positioning system (e.g., a GPS receiver) can be integrated into the mobile device 300 (e.g., embodied as a mobile type of user device, such as a tablet computer or smartphone) or provided as a separate device that can be coupled to the mobile device 300 through an interface to provide access to location-based services.

In some embodiments, a port device 390, e.g., a universal serial bus (USB) port, or a docking port, or some other wired port connection, can be included. The port device 390 can, for example, be utilized to establish a wired connection to other computing devices, such as other communication devices 300, network access devices, a personal computer, a printer, a display screen, or other processing devices capable of receiving and/or transmitting data. In some embodiments, the port device 390 allows the mobile device 300 to synchronize with a host device using one or more protocols, such as, for example, the TCP/IP, HTTP, UDP and any other known protocol.

The mobile device 300 can also include a camera lens and sensor 380. In some embodiments, the camera lens and sensor 380 can be located on the back surface of the mobile device 300. The camera may be configured for capturing still images and/or video images.

The mobile device 300 may also include one or more wireless communication subsystems, such as an 802.11b/g communication device 386, and/or a Bluetooth™ communication device 388. Other communication protocols can also be supported, including other 802.x communication protocols (e.g., WiMax, Wi-Fi, 4G), code division multiple access (CDMA), global system for mobile communications (GSM), enhanced data GSM environment (EDGE), etc.

Figure 4:
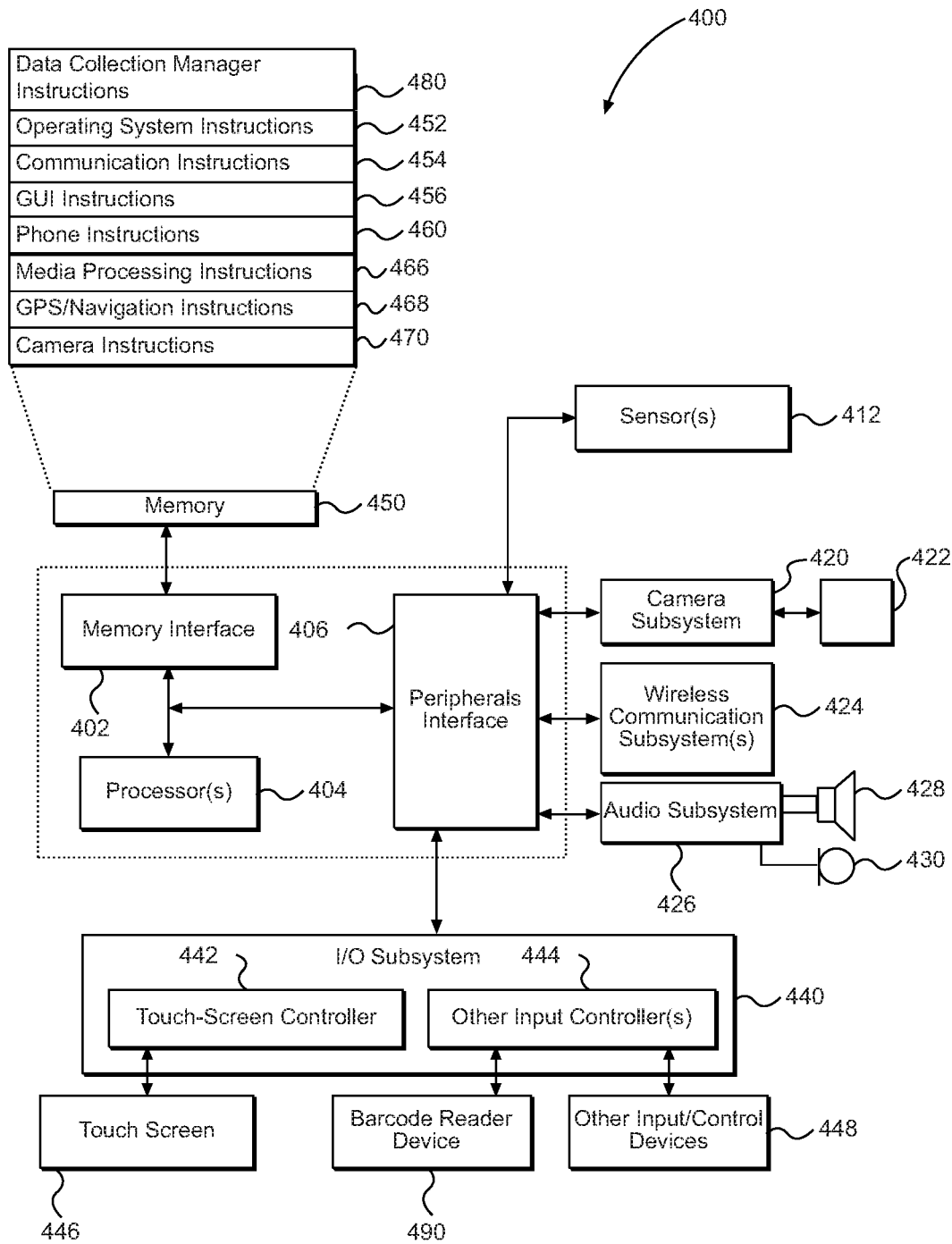
FIG. 4 is a diagram of a mobile device architecture according to an embodiment of the present invention.

FIG. 4 is a block diagram of an example architecture 400 for the mobile device of FIG. 3. The mobile device 300 may include a memory interface 402, one or more data processors, image processors and/or central processing units 404, and a peripherals interface 406. The memory interface 402, the one or more processors 404 and/or the peripherals interface 406 can be separate components or can be integrated in one or more integrated circuits. The various components in the mobile device 300 can be coupled by one or more communication buses or signal lines.

Sensors 412 and other devices and subsystems may be coupled to the peripherals interface 406 to facilitate multiple functionalities. For example, a motion sensor, a light sensor, and a proximity sensor may be coupled to the peripherals interface 406 to facilitate orientation, lighting, and proximity functions. Other sensors 412 can also be connected to the peripherals interface 406, such as a positioning system (e.g., GPS receiver), a temperature sensor, a biometric sensor, or other sensing device, to facilitate related functionalities.

A camera subsystem 420 and an optical sensor 422, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 424, which can include radio frequency receivers and transmitters and/or optical (e.g., infrared) receivers and transmitters. The specific design and embodiment of the communication subsystem 424 can depend on the communication network(s) over which the mobile device 300 is intended to operate. For example, a mobile device 300 may include communication subsystems 424 designed to operate over a GSM network, a GPRS network, an EDGE network, a Wi-Fi or WiMax network, and a Bluetooth™ network.

An audio subsystem 426 may be coupled to a speaker 428 and a microphone 430 to facilitate voice-enabled functions, such as voice recognition, voice replication, digital recording, and telephony functions. In one example, microphone 430 may be useful for capturing raw data in audio form (e.g., for recording observations or notes by a user).

The I/O subsystem 440 may include a touch screen controller 442 and/or other input controller(s) 444. The touch-screen controller 442 may be coupled to a touch screen 446. The touch screen 446 and touch screen controller 442 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 446.

Other input controller(s) 444 may be coupled to other input/control devices 448, such as one or more buttons, rocker switches, thumb-wheel, infrared port, USB port, and/or a pointer device such as a stylus. One or more buttons (not shown) may include an up/down button for volume control of the speaker 428 and/or the microphone 430. Other input controller(s) 444 may also be coupled to a barcode reader device 490, for scanning barcode images (e.g., printed on paper or other physical objects).

In some embodiments, the mobile device 300 may present recorded audio and/or video files, such as MP3, AAC, and MPEG files, and/or streaming audio and video files (e.g., provided by a web-based service providing streaming media). In some embodiments, the mobile device 300 may include the functionality of an MP3 player or other type of media player. Other input/output and control devices may also be used.

The memory interface 402 may be coupled to memory 450. The memory 450 may include high-speed random access memory and/or non-volatile memory, such as one or more magnetic disk storage devices, one or more optical storage devices, and/or flash memory (e.g., NAND, NOR). The memory 450 can store an operating system 452, such as Darwin, RTXC, LINUX, UNIX, OS X, WINDOWS, or an embedded operating system such as VxWorks. The operating system 452 may include instructions for handling basic system services and for performing hardware dependent tasks. In some embodiments, the operating system instructions 452 can be a kernel (e.g., UNIX kernel).

The memory 450 may also store communication instructions 454 to facilitate communicating with one or more additional devices, one or more computers and/or one or more servers.

The memory 450 may include graphical user interface (GUI) instructions 456 to facilitate graphic user interface processing; phone instructions 460 to facilitate phone-related processes and functions; media processing instructions 466 to facilitate media processing-related processes and functions; GPS/Navigation instructions 468 to facilitate GPS and navigation-related processes and instructions; and/or camera instructions 470 to facilitate camera-related processes and functions.

The memory 450 may include data collection manager instructions 480 to facilitate various embodiments described in this disclosure with respect to receiving raw data inputs (e.g., audio files, video files, tablet handwriting application files, barcode data, and/or text input), receiving and processing images and audio, receiving and transmitting GPS information, receiving and transmitting information about objects, locations, and persons, and the like.

Each of the above identified instructions and applications may correspond to a set of instructions for performing one or more functions described above. These instructions need not be implemented as separate software programs, procedures, or modules. The memory 450 may include additional instructions or fewer instructions. Furthermore, various specialized functions of the mobile device 300, in accordance with embodiments described in this disclosure, may be implemented in hardware and/or in software, including in one or more signal processing and/or application-specific integrated circuits.

According to some embodiments, processes described in this disclosure may be performed and/or implemented by and/or otherwise associated with one or more specialized processing devices (e.g., the devices of FIGS. 1-4 in this disclosure), specialized computers, specialized computer terminals, specialized computer servers, specialized computer systems, and/or specialized networks, and/or any combinations thereof. In some embodiments, methods may be embodied in, facilitated by, and/or otherwise associated with various input mechanisms and/or interfaces.

Any processes described in this disclosure do not necessarily imply a fixed order to any depicted actions, steps, and/or procedures, and embodiments may generally be performed in any order that is practicable unless otherwise and specifically noted. Any of the processes and/or methods described in this disclosure may be performed and/or facilitated by specialized hardware, software (including microcode), firmware, or any combination of such specialized components, as described in this disclosure. For example, a storage medium (e.g., a hard disk, USB mass storage device, and/or digital video disk (DVD)) may store thereon instructions that when executed by a specialized machine or system described in this disclosure result in performance according to any one or more of the embodiments described in this disclosure.

Figure 5:
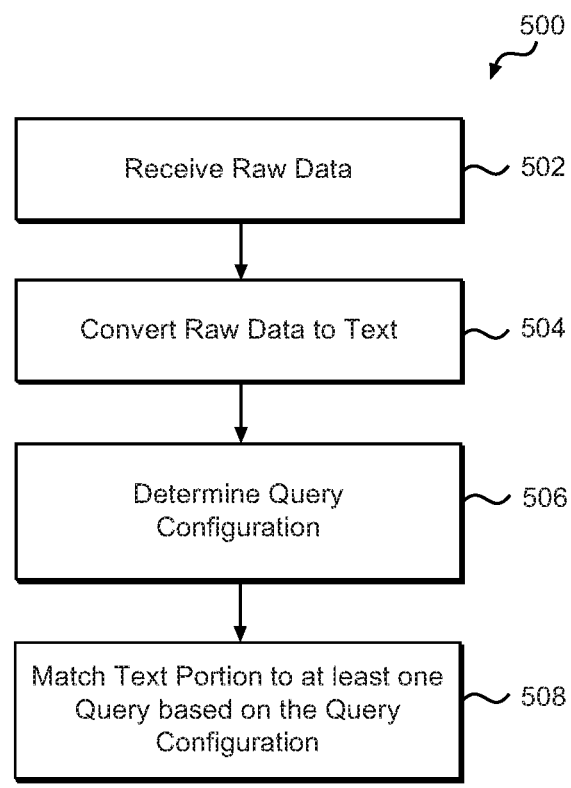
FIG. 5 is a flowchart of a method according to an embodiment of the present invention.

Referring now to FIG. 5, a flow diagram of a method 500 according to some embodiments is shown. The method 500 may be performed, for example, by a specialized server computer or specialized computerized device (e.g., mobile device 102, conversion and learning system 106, mobile devices 246a-b, raw data parser server 202, answer discovery server 204, and/or system controller 206). It should be noted that although some of the steps of method 500 may be described as being performed by a server computer, for example, while other steps are described as being performed by another computing device, any and all of the steps may be performed by a single computing device which may be a mobile device, desktop computer, or another computing device, in accordance with the embodiments described in this disclosure. Further, any steps described herein as being performed by a computing device described in the specification may, in some embodiments, be performed by another computing device described in the specification, as deemed appropriate for a particular implementation.

According to some embodiments, the method 500 may comprise receiving raw data, at 502, and converting the raw data to text, at 504. The method 500 may further comprise determining at least one query configuration, at 506. In one embodiment, an answer discovery server and/or answer discovery service may determine a query configuration based on the text derived from the raw data. For example, based on certain keywords identified by the answer discovery service 216 in the derived text, the answer discovery service 216 may select a query configuration (e.g., stored in query configuration data 220) associated with one or more of the identified keywords. In one example, if a keyword "cars" is identified in converted raw data, "cars" may be associated with one or more different query configurations (and/or with one or more queries).

According to some embodiments, the method 500 may comprise matching a text portion (e.g., a text keyword identified at 504) to at least one query based on the query configuration, at 508. According to some embodiments, a query configuration may comprise one or more predefined queries. Some examples of queries are described in this disclosure with respect to some example implementations.

In one embodiment, the answer discovery service 216 may match a text portion that is associated with an identified keyword to one or more queries of the query configuration. For example, a first text portion "cars" and a second text portion "3" may be derived from raw data (e.g., from a handwritten note parsed by the raw data parser server 202 using OCR analysis 211). The first text portion "cars" may be used to select a query configuration (linked to the keyword "cars," "vehicle," and/or "car") that includes a first query about how many cars are owned by a person, and the second text portion "3" may be matched by the answer discovery service 216 to that first query as representative of the number of cars a person owns. In another example, the same query configuration (or a different query configuration) may include a second query about how long a person has owned a vehicle, and the second text portion "3" may be matched by the answer discovery service 216 to that second query as representative of how long a person has owned a vehicle. In a further example, the second example query configuration may define another query and/or expand the second query to require (or at least analyze the converted raw data for) an indication of a period of ownership. Accordingly, the answer discovery service 216 may analyze derived text portions to identify a third text portion associated with the second text portion "3" (e.g., written near or spoken near) that indicates a unit of time (e.g., "years," "days," "months," etc.).

According to some embodiments, a method may further comprise storing the matched text portion(s) in association with the corresponding query or queries (e.g., in query answer data 217). In some embodiments, a method may comprise formatting text portions based on the one or more selected queries. In one example, an answer, "3 months" identified in one or more text portions of the derived text may be stored in association with the second query about how long a person has owned a vehicle.

In one embodiment, a query and/or an answer may be associated with the raw data from which the text was derived that provides the determined answer. In one example, a raw data source may be identified by a unique identifier that is associated (e.g., in query answer data 217) with a unique identifier that identifies a query and/or with a unique identifier that identifies a formatted text portion that provides an answer to the query. Accordingly, as described in this disclosure with respect to some embodiments, an answer discovery server 204 and/or answer discovery service 216 may generate a first portion of a user interface including the formatted text portion (i.e., an answer to a query) and generate a second portion of the user interface including the corresponding raw data from which the answer to the query was derived or matched.

In one example implementation of a method consistent with one or more embodiments of the present invention, a computerized mobile device specialized with a raw data collection mobile application and comprising a communications interface may collect information about an object, location, or person and transmit, to a conversion and learning server (e.g., conversion and learning system 106, conversion and learning system 201) via the communications interface, the collected information (e.g., the raw data for analysis by a raw data parser service and/or an answer discovery service).

As discussed with respect to various embodiments in this disclosure, the computerized mobile device may further comprise an image capture device (e.g., camera subsystem 420 of FIG. 4). Accordingly, the raw data collected by the mobile device may comprise at least one electronic image file captured by the image capture device.

In one embodiment, the method 500 may further comprise transmitting information about one or more identified text portions, queries, answers, and/or query configurations to the computerized mobile device.

According to some embodiments, a conversion and learning system and/or an appropriately configured mobile device (e.g., executing a mobile application) may further provide for transmitting queries and/or answers (e.g., related to a location, object, or person) to one or more types of enterprise application systems, such as, without limitation, an augmented reality application system, a virtual reality application system, a file management system, an inventory application system, and/or a mapping application system.

Figure 6:
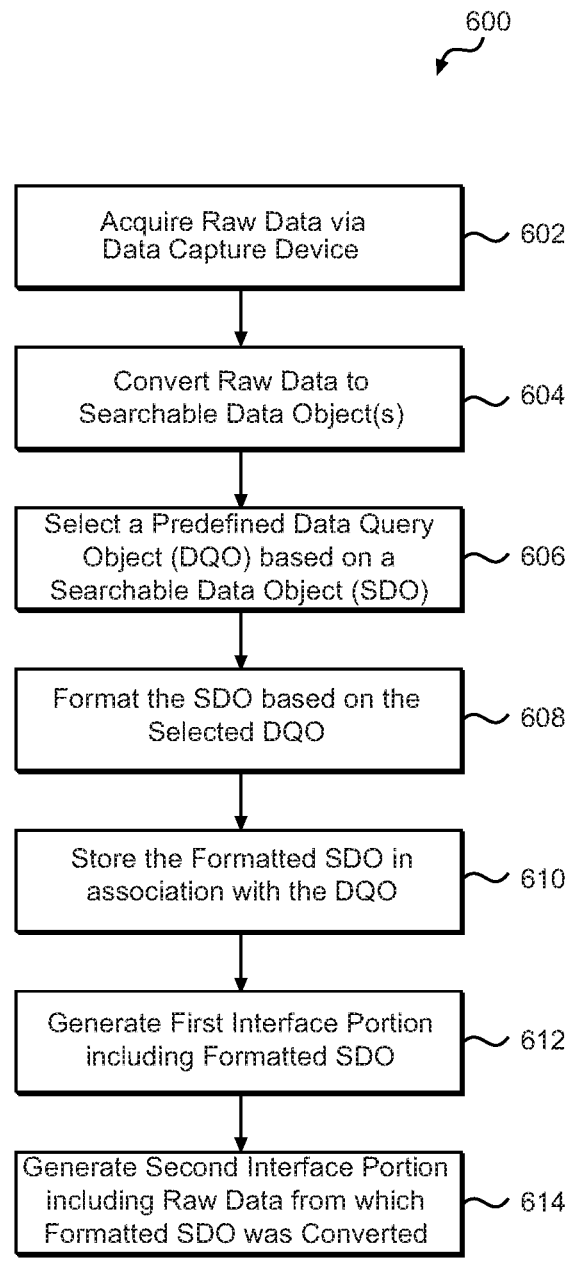
FIG. 6 is a flowchart of a method according to an embodiment of the present invention.

Referring now to FIG. 6, a flow diagram of a method 600 according to some embodiments is shown. The method 600 may be performed, for example, by a specialized server computer or specialized computerized device (e.g., mobile device 102, conversion and learning system 106, mobile devices 246*a-b*, raw data parser server 202, and/or system controller 206). It should be noted that although some of the steps of method 600 may be described as being performed by a server computer, for example, while other steps are described as being performed by another computing device, any and all of the steps may be performed by a single computing device which may be a mobile device, desktop computer, or another computing device, in accordance with the embodiments described in this disclosure. Further, any steps described herein as being performed by a particular computing device described in the specification may, in some embodiments, be performed by another computing device described in the specification, as deemed appropriate for a particular implementation.

According to some embodiments, the method 600 may comprise acquiring raw data (e.g., an image, audio, barcode, and/or electronic ink input, embodied as an electronic file) using a data capture device (e.g., integrated in a mobile device), at 602. In one example, a mobile device may be used by a user to capture an image of an object or person (e.g., using a camera of the mobile device), an audio file of a user's or other person's voice (e.g., using a microphone of the mobile device), electronic handwritten notes (e.g., using a stylus, pointer, or finger to write notes on a touch screen using an electronic ink or handwriting recognition mobile application), text notes (e.g., input using a keyboard or speech-to-text recognition application), and/or a barcode (e.g., scanned from a paper using a camera device).

The method 600 may comprise converting the raw data to one or more searchable data object (s), such as, but not limited to, corresponding text information and/or text files, at 604. In some embodiments, any searchable data objects may be stored in association with the corresponding raw data. In one embodiment, a method may comprise uploading the acquired raw data from a mobile device to a conversion and learning system, answer discovery service, and/or raw data parser service. In one embodiment, a method may comprise receiving the raw data from a mobile device. In one embodiment, the mobile device transmits (e.g., over a wireless communication network) the raw data to an answer discovery service (e.g., hosted by conversion and learning system 106 or conversion and learning system 201).

In some embodiments, for example, an electronic image file is compared to a general image recognition pool, and objects of the image are identified (e.g., in accordance with object recognition analysis instructions 208). In one embodiment, a raw data parser service processes the image to extract object data using an image recognition process. The system then compares the extracted object data with stored object image data (e.g., object image DB 212) to identify an object match. After the object is identified (e.g., a type of the object in the image is determined), the identified object is classified based on information in a stored content database (e.g., object classification DB 214). In one example, the identified object may be classified using one or more keywords, other types of text descriptions, or other searchable data objects.

Similarly, in some embodiments, for example, an electronic audio file is analyzed (e.g., using voice recognition analysis instructions 215) to convert speech to text or other searchable data objects corresponding to the raw data. Raw data comprising images of text characters or barcodes may be parsed and analyzed, respectively, using OCR analysis instructions 211 or barcode analysis instructions 213, to generate searchable data objects.

The method 600 may comprise selecting a predefined data query object based on a searchable data object, at 606, formatting the searchable data object based on the selected data query object, at 608, and storing the formatted searchable data object in association with the data query object, at 610 (e.g., in query answer data 217).

In one example, a searchable data object such as a text keyword or object classification may be used to select a query configuration comprising one or more queries, form fields, database fields, or other type of predefined data query object. A data query object may be associated with one or more keywords, for example, and the data query object may be selected if one or more of the keywords is identified in keywords derived from raw data. According to some embodiments, the instructions for selecting a predefined data query object may comprise instructions for analyzing searchable data objects using rules for matching searchable data objects to predefined criteria. Some non-limiting examples of instructions comprising rules are provided in this disclosure.

Formatting a searchable data object based on the selected data query object may comprise determining and applying formatting suitable for displaying the searchable data object via a user interface. Formatting may comprise determining related fonts, style, sizes, colors, placement on a displayed interface, and the like. In some embodiments, formatting the searchable data object may comprise determining a displayable form or form field(s) associated with the selected data query object. Storing the formatted searchable data object in association with the data query object may comprise associating the formatted searchable data object with a form field corresponding to the selected data query object.

In some embodiments, formatting a searchable data object may comprise combining two or more identified text portions to generate an answer to a query, such as by combining text data objects "3" and "months" to format a searchable answer data object as "3 months" (e.g., the response to a selected query).

The method 600 may comprise generating a first interface portion including the formatted searchable data object, at 612, and generating a second interface portion including the raw data from which the formatted searchable data object was converted, at 614. As described in this disclosure and depicted in FIGS. 8-10, an interface may be generated that displays a formatted answer or other searchable data object in conjunction with related raw data. In one example, identified text may be generated in one interface portion while the raw data from which the text was converted is generated in another interface portion. For instance, the raw data scan of a handwritten note may be displayed in conjunction with the corresponding text that was parsed from the raw data. In this manner, a user may compare the raw data with the recognized information to assess the accuracy of the conversion (e.g., whether the handwritten note says what the parsed text indicates) and/or the suitability of associating the recognized text with a particular data query (e.g., whether the recognized text answers the question defined by the data query).

Any or all the methods described in this disclosure may involve one or more interface(s). One or more of such methods may include, in some embodiments, providing an interface by and/or through which a user may review raw data files, information recognized from the raw data (e.g., keywords and other types of text portions, text descriptions, or searchable data objects), selected queries, and/or formatted searchable data objects (e.g., queries with answers derived from the recognized information). Although certain types of information are illustrated in the example interfaces, those skilled in the art will understand that the interfaces may be modified in order to provide for additional types of information and/or to remove some of the illustrated types of information, as deemed desirable for a particular implementation.

Figure 7:
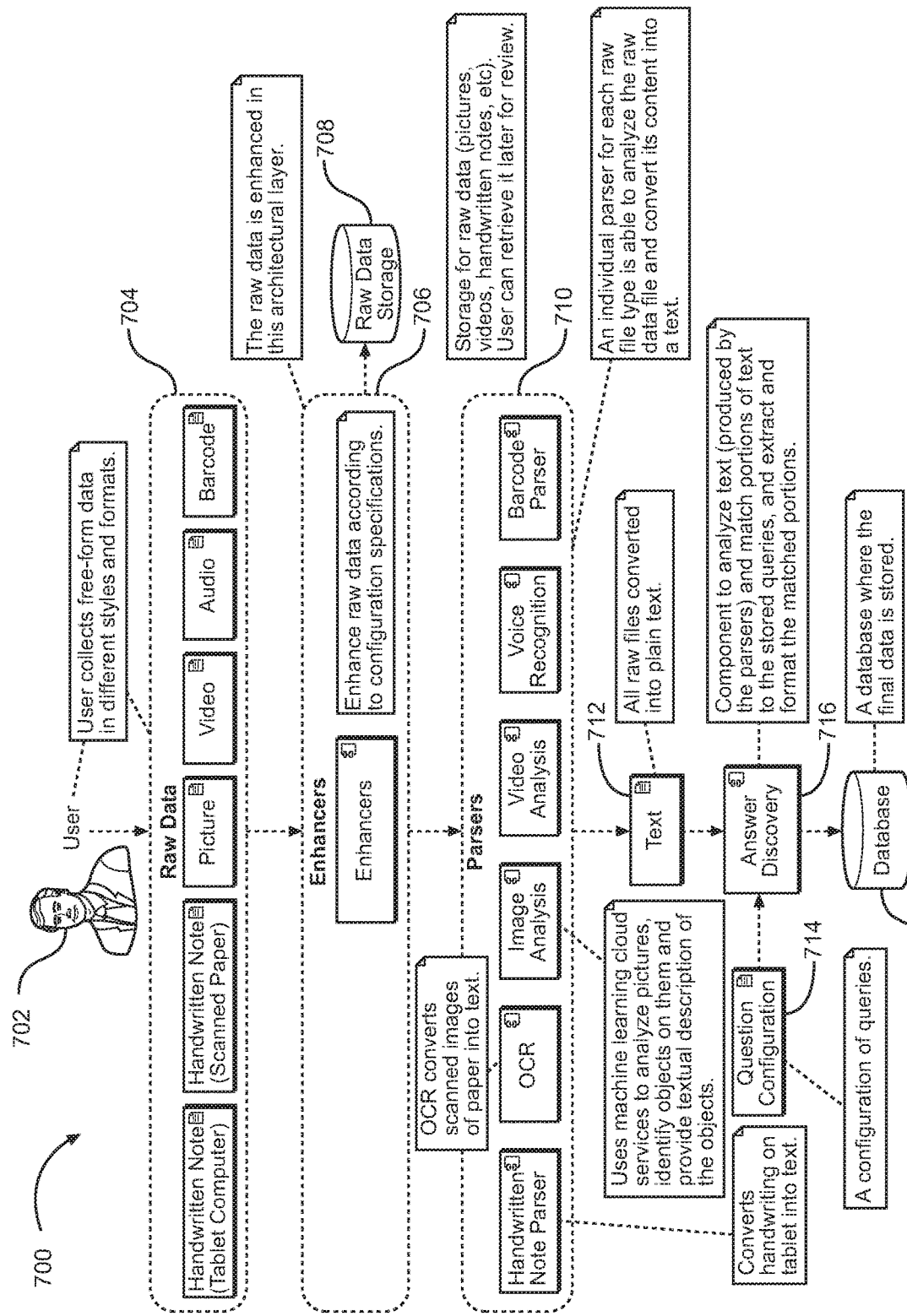
FIG. 7 is a flowchart of a method according to an embodiment of the present invention.

Referring now to FIG. 7, a flow diagram of an example method 700 according to one embodiment is shown. FIG. 7 includes depictions of example system components and the flow of how information may be processed in a conversion and learning system to convert raw data files into plain text. FIG. 7 also includes some specific descriptions of the depicted example steps and components.

The method 700 may comprise a user 702 collecting various types of raw data 704. The raw data 704 may be enhanced by one or more enhancers 706, such as utility or software applications configured to adjust, modify, filter, and/or clarify one or more types of raw data prior to parsing the raw data. In one example, raw data comprising image files may be first processed by a picture enhancer for resizing image files according to a predefined specification for file size. In another example, raw data image files may be enhanced by automatically adjusting contrast, brightness, orientation, and/or color. In another example, raw data audio files may be enhanced by filtering out background noise, adjusting volume levels and/or audio distortion in the audio files. The raw data 704, before and/or after being enhanced by enhancers 706, may be stored in raw data storage 708. In accordance with some embodiments, the enhanced raw data is passed to one or more parsers 710. In accordance with the example depicted in FIG. 7, the parsers 710 convert all raw data files into plain text 712 (and/or other types of searchable data objects), which is forwarded to an answer discovery service 716 for analyzing the text 712 and matching portions of the text 712 to stored queries, and to extract and format the matched portions. Queries are configured in question configuration data 714, which is accessed by the answer discovery service 716. Finally, the database 718 is used to store the final data for the conversion and learning process.

Figure 8:
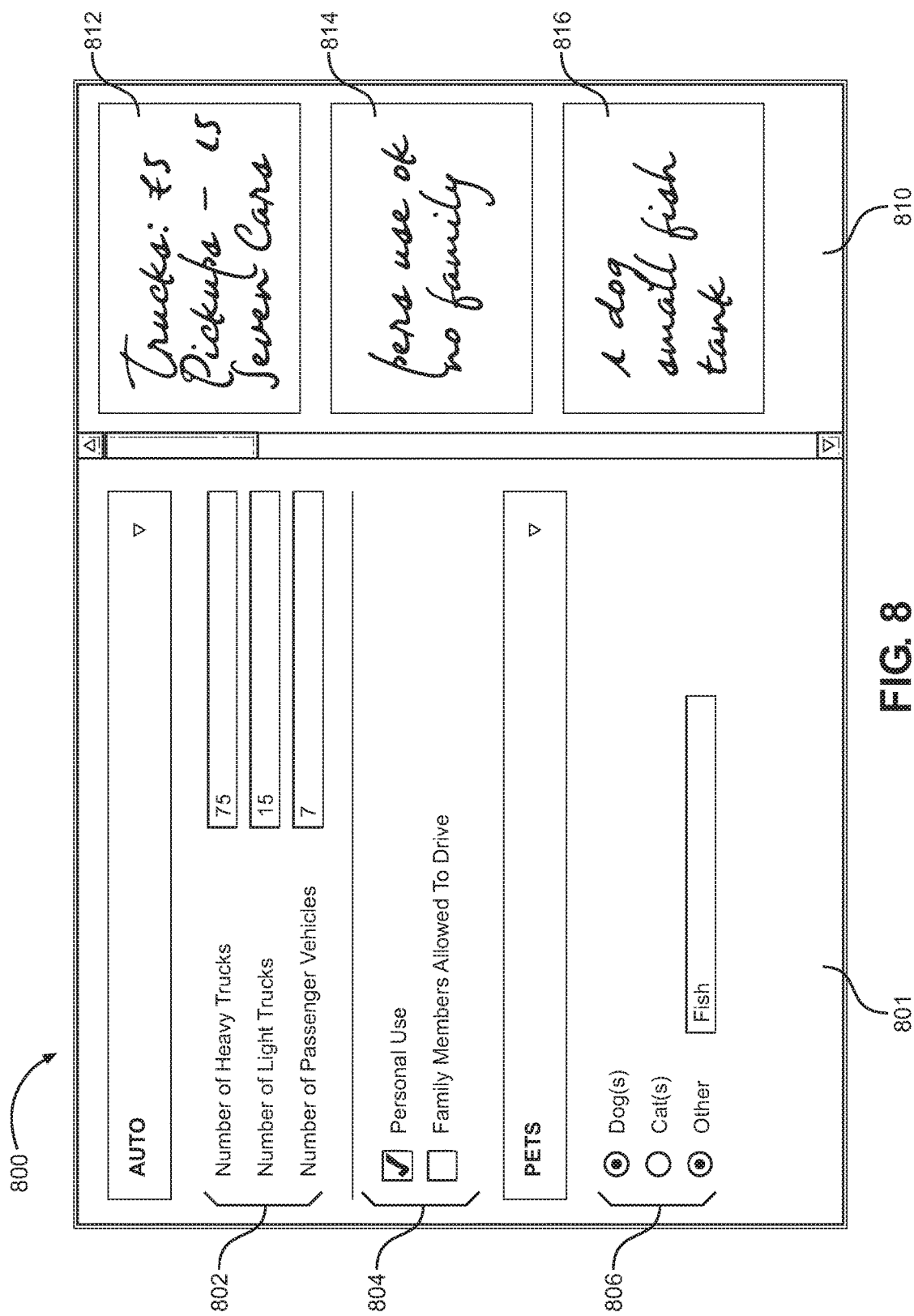
FIG. 8 is a diagram of an example user interface according to an embodiment of the present invention.
Figure 9:
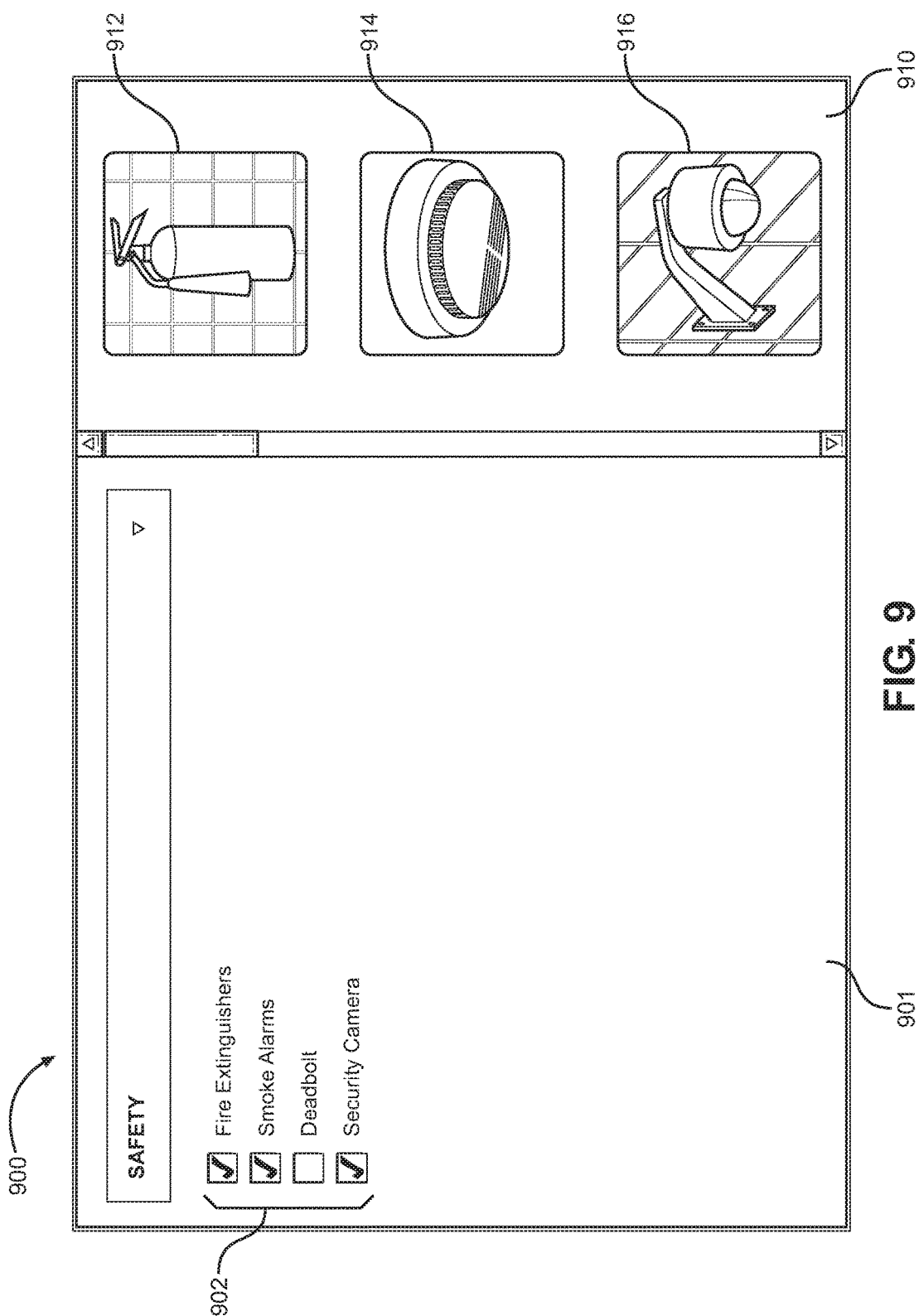
FIG. 9 is a diagram of an example user interface according to an embodiment of the present invention.
Figure 10:
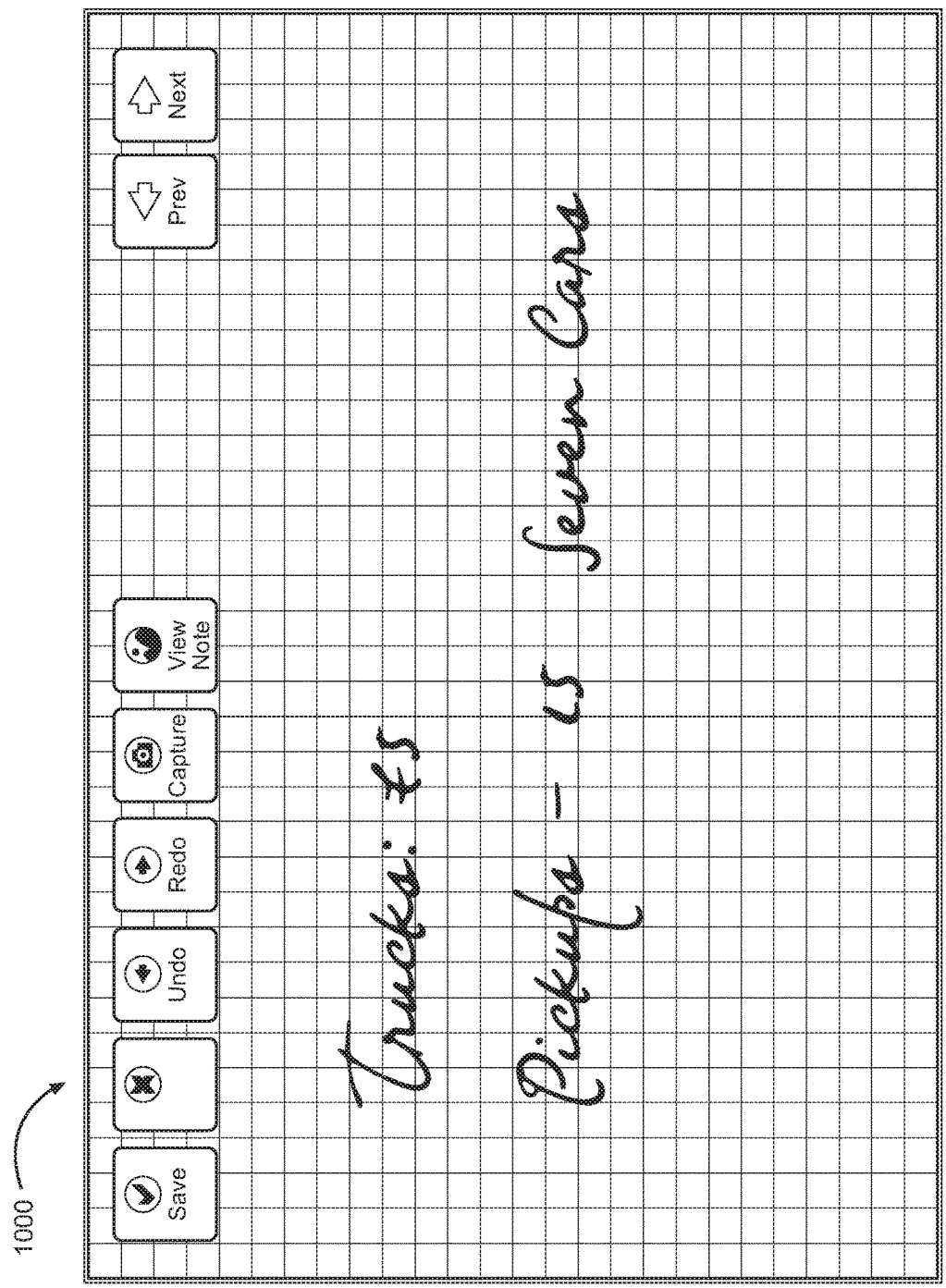
FIG. 10 is a diagram of an example user interface according to an embodiment of the present invention.

FIGS. 8-10 depict respective example user interfaces 800, 900, and 1000, according to some embodiments. In some embodiments, a computing device (e.g., a mobile device, a personal computer) comprising a display device may be specially configured to output one or more of the interactive user interfaces 800, 900, and 1000. As depicted in user interface 800, an example web-based application presents "Auto" and "Pets" information about a location, person, or business. The user interface 800 includes example formatted searchable data objects 802, 804, and 806 displayed in a first interface portion 801. Raw data information 812, 814, and 816 are displayed in a second interface portion 810 as electronic scan images of a handwritten note or electronic ink notes.

The formatted searchable data objects depicted at 802, for example, include query information ("Number of Heavy Trucks," "Number of Light Trucks," "Number of Passenger Vehicles") and corresponding answers ("75," "15," "7") related to numbers of different types of vehicles. The raw data source information from which the answers were derived is depicted at 812. As described in this disclosure, the identification of the words "trucks," "pickups," and "cars" may have been used to select the query configuration and/or data queries represented by the displayed form (or portions thereof). As also described in this disclosure, the specific numbers converted from the raw data were selected as answers to the specific queries represented in the first interface portion (the respective numbers of vehicles of different types). According to the answer discovery service applied to the raw data 812, the identified text "trucks" was associated with the data query object for "Number of Heavy Trucks," while the identified text "pickups" was associated with the data query object for "Number of Light Trucks." It will be understood that any number of keywords may be associated with a given data query object, and that a given keyword may be associated with more than one data query.

Example user interface 800 provides some examples of formatted searchable data objects. The queries at 802 are represented as form fields, the queries at 804 are represented as checkboxes or Yes/No queries, while the queries at 806 includes a mix of Yes/No formatting and form fields.

According to some embodiments, a user may input, review, and/or modify the information presented via the user interface 800, such as, by example and without limitation, touching an editable field and typing information into the application using a hardware or software keyboard, or audio input device. As discussed with respect to some embodiments described in this disclosure, the formatted information presented as answers or responses to the various queries may be reviewed by a user and compared to the corresponding raw data file 812, 814, or 816 for accuracy, and the suitability of the formatted information for the underlying query may also be evaluated.

As depicted in user interface 900 of FIG. 9, the example "Safety" section depicted in the first interface portion 901 includes a formatted presentation of searchable data objects 902. The formatted searchable data objects 902 includes an indication of whether the listed objects were identified in raw data image files 912, 914, and 916 depicted in the second interface portion 910.

As depicted in user interface 1000 of FIG. 10, an example "Data Collection Manager" mobile application presents a set of example function buttons and an example handwritten note (raw data) captured by a user (e.g., using a mobile device). According to some embodiments, a user may add audio, video, barcode, and handwriting raw data, and may delete, review, and/or modify the collected data via the user interface 1000 (e.g., before transmitting the raw data to an answer discovery service).

According to some embodiments, a user may post handwriting files, audio, or image files to a server using a mobile application Interpretation The present disclosure is neither a literal description of all embodiments nor a listing of features that must be present in all embodiments.

Neither the Title (set forth at the beginning of the first page of this disclosure) nor the Abstract (set forth at the end of this disclosure) is to be taken as limiting in any way the scope of the disclosed invention(s).

Throughout the description and unless otherwise specified, the following terms may include and/or encompass the example meanings provided below. These terms and illustrative example meanings are provided to clarify the language selected to describe embodiments both in the specification and in the appended claims, and accordingly, are not intended to be limiting.

The phrase "based on" does not mean "based only on", unless expressly specified otherwise. In other words, the phrase "based on" describes both "based only on" and "based at least on".

As used in this disclosure, a "user" may generally refer to any individual and/or entity that operates a user device.

Some embodiments may be associated with a "user device" or a "network device". As used in this disclosure, the terms "user device" and "network device" may be used interchangeably and may generally refer to any device that can communicate via a network. Examples of user or network devices include a personal computer (PC), a workstation, a server, a printer, a scanner, a facsimile machine, a copier, a personal digital assistant (PDA), a storage device (e.g., a disk drive), a hub, a router, a switch, and a modem, a video game console, or a wireless phone. User and network devices may comprise one or more communication or network components.

Some embodiments may be associated with a "network" or a "communication network". As used in this disclosure, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. In some embodiments, networks may be hard-wired, wireless, virtual, neural, and/or any other configuration or type of network that is or becomes known. Networks may comprise any number of computers and/or other types of devices in communication with one another, directly or indirectly, via a wired or wireless medium such as the Internet, LAN, WAN or Ethernet (or IEEE 802.3), Token Ring, RF, cable TV, satellite links, or via any appropriate communications means or combination of communications means. In some embodiments, a network may include one or more wired and/or wireless networks operated in accordance with any communication standard or protocol that is or becomes known or practicable. Exemplary protocols for network communications include but are not limited to: the Fast Ethernet LAN transmission standard 802.3-2002® published by the Institute of Electrical and Electronics Engineers (IEEE), Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), system to system (S2S), or the like. Communication between and/or among devices may be encrypted to ensure privacy and/or prevent fraud in any one or more of a variety of ways well known in the art.

Devices that are in communication with each other need not be in continuous communication with each other, unless expressly specified otherwise. On the contrary, such devices need only transmit to each other as necessary or desirable, and may refrain from exchanging data most of the time. For example, a machine in communication with another machine via the Internet may not transmit data to the other machine for weeks at a time. In addition, devices that are in communication with each other may communicate directly or indirectly through one or more intermediaries.

As used in this disclosure, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described in this disclosure are associated with an "indication". The term "indication" may be used to refer to any indicia and/or other information indicative of or associated with a subject, item, entity, and/or other object and/or idea. As used in this disclosure, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

"Determining" something may be performed in a variety of manners and therefore the term "determining" (and like terms) includes calculating, computing, deriving, looking up (e.g., in a table, database or data structure), ascertaining, recognizing, and the like.

A "processor" means any one or more microprocessors, Central Processing Unit (CPU) devices, computing devices, microcontrollers, digital signal processors, or like devices. Examples of processors include, without limitation, INTEL's PENTIUM, AMD's ATHLON, or APPLE's A6 processor.

When a single device or article is described in this disclosure, more than one device or article (whether or not they cooperate) may alternatively be used in place of the single device or article that is described. Accordingly, the functionality that is described as being possessed by a device may alternatively be possessed by more than one device or article (whether or not they cooperate). Where more than one device or article is described in this disclosure (whether or not they cooperate), a single device or article may alternatively be used in place of the more than one device or article that is described. For example, a plurality of computer-based devices may be substituted with a single computer-based device. Accordingly, functionality that is described as being possessed by more than one device or article may alternatively be possessed by a single device or article. The functionality and/or the features of a single device that is described may be alternatively embodied by one or more other devices that are described but are not explicitly described as having such functionality and/or features. Thus, other embodiments need not include the described device itself, but rather may include the one or more other devices that would, in those other embodiments, have such functionality/features.

A description of an embodiment with several components or features does not imply that any particular one of such components and/or features is required. On the contrary, a variety of optional components are described to illustrate the wide variety of possible embodiments of the present invention(s). Unless otherwise specified explicitly, no component and/or feature is essential or required.

Further, although process steps, algorithms or the like may be described or depicted in a sequential order, such processes may be configured to work in one or more different orders. In other words, any sequence or order of steps that may be explicitly described or depicted does not necessarily indicate a requirement that the steps be performed in that order. The steps of processes described in this disclosure may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications, does not imply that the illustrated process or any of its steps is necessary to the invention, and does not imply that the illustrated process is preferred.

It will be readily apparent that the various methods and algorithms described in this disclosure may be implemented by, e.g., specially-configured and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer-readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

Accordingly, a description of a process likewise describes at least one apparatus for performing the process, and likewise describes at least one computer-readable medium and/or computer-readable memory for performing the process. The apparatus that performs a described process may include components and/or devices (e.g., a processor, input and output devices) appropriate to perform the process. A computer-readable medium may store program elements and/or instructions appropriate to perform a described method.

The term "computer-readable medium" refers to any medium that participates in providing data (e.g., instructions or other information) that may be read by a computer, a processor, or a like device. Various forms of computer-readable media may be involved in carrying data, including sequences of instructions, to a processor. For example, sequences of instruction (i) may be delivered from RAM to a processor, (ii) may be carried over a wireless transmission medium, and/or (iii) may be formatted according to any one or more of various known formats, standards, or protocols (some examples of which are described in this disclosure with respect to communication networks).

Computer-readable media may take many forms, including but not limited to, non-volatile media, volatile media, and transmission media. Non-volatile media may include, for example, optical or magnetic disks and other types of persistent memory. Volatile media may include, for example, DRAM, which typically constitutes the main memory for a computing device. Transmission media may include, for example, coaxial cables, copper wire, and fiber optics, including the wires that comprise a system bus coupled to the processor. Transmission media may include or convey acoustic waves, light waves, and electromagnetic emissions, such as those generated during RF and IR data communications. Common forms of computer-readable media include, for example, a floppy disk, a flexible disk, a hard disk, magnetic tape, any other magnetic medium, a CD-ROM, DVD, any other optical medium, a punch card, paper tape, any other physical medium with patterns of holes, a RAM, a PROM, an EPROM, a FLASH-EEPROM, a Universal Serial Bus (USB) memory stick or thumb drive, a dongle, any other memory chip or cartridge, a carrier wave, or any other medium from which a computer can read.

The term "computer-readable memory" may generally refer to a subset and/or class of non-transitory computer-readable medium that does not include intangible or transitory signals, waves, waveforms, carrier waves, electromagnetic emissions, or the like. Computer-readable memory may typically include physical, non-transitory media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, USB devices, any other memory chip or cartridge, and the like.

Where databases are described, it will be understood by one of ordinary skill in the art that (i) alternative database structures to those described may be readily employed, and (ii) other memory structures besides databases may be readily employed. Any illustrations or descriptions of any sample databases presented in this disclosure are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries may be different from those described in this disclosure. Further, despite any depiction of the databases as tables, other formats (including relational databases, object-based models, hierarchical electronic file structures, and/or distributed databases) could be used to store and/or manipulate the described data. Likewise, object methods or behaviors of a database may be used to implement one or more of various processes, such as those described in this disclosure. In addition, the databases may, in a known manner, be stored locally and/or remotely from a device that accesses data in such a database. Furthermore, while unified databases may be contemplated, it is also possible that the databases may be distributed and/or duplicated among a variety of devices.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

What is claimed is:

1. A machine-based learning system comprising:
a computerized mobile device comprising:
a processor,
a touchscreen input device in communication with the processor,
a microphone in communication with the processor,
an image capture device in communication with the processor,
a wireless communications interface in communication with the processor, and
a computer-readable memory in communication with the processor, the computer-readable memory storing a raw data capture application that when executed by the processor directs the processor to:
receive raw data via at least one of the touchscreen input device, the microphone, and the image capture device; and
transmit, using the wireless communications interface,
the raw data to a data conversion and learning server; and
the data conversion and learning server, comprising:
a second processor;
a second computer-readable memory in communication with the second processor, the second computer-readable memory storing instructions that when executed by the second processor direct the second processor to:
receive, from the computerized mobile device, the raw data;
convert the raw data into at least one searchable data object using at least one data parser;
access a database of a plurality of predefined data query objects;
select a searchable data object of the at least one searchable data object converted from the raw data;
identify at least one predefined data query object of the plurality of predefined data query objects, based on the selected searchable data object;
format the selected searchable data object based on the identified at least one predefined data query object; and
store at least a respective portion of the selected searchable data object in association with each identified at least one predefined data query object,
wherein formatting the selected searchable data object based on the identified at least one predefined data query object comprises:
generating a first interface portion of a user interface including the formatted searchable data object; and
generating a second interface portion including the raw data from which the formatted searchable data object was converted.

2. The system of claim 1, wherein converting the raw data into at least one searchable data object comprises:
selecting a text description for at least one physical object indicated in the raw data.

3. The system of claim 1, wherein converting the raw data into at least one searchable data object comprises:
identifying at least one physical object displayed in a video file of the raw data by comparing the video file to stored object image data using a video analysis parser; and
selecting a text description for the at least one identified physical object.

4. The system of claim 1, wherein converting the raw data into at least one searchable data object comprises:
identifying at least one physical object displayed in an image file of the raw data by comparing the image file to stored object image data using an image analysis parser; and
selecting a text description for the at least one identified physical object.

5. The system of claim 1, wherein converting the raw data into at least one searchable data object comprises:
identifying at least one text description in the raw data using at least one of the following:
an electronic handwriting parser, and
an optical character recognition parser.

6. The system of claim 1, wherein converting the raw data into at least one searchable data object comprises:
identifying at least one audio description in the raw data using a voice recognition parser; and
selecting a text description for the at least one audio description.

7. The system of claim 1, wherein converting the raw data into at least one searchable data object comprises:
identifying at least one barcode in the raw data using a barcode parser; and
selecting barcode information associated with the at least one barcode.

8. The system of claim 1, wherein the identified at least one predefined data query object comprises a predefined form field for an information intake process.

9. The system of claim 1, wherein identifying the at least one predefined data query object based on the selected searchable data object comprises:
comparing a first text description associated with the selected searchable data object to a respective second text description associated with each predefined data query object.

10. A machine-based learning method, the method comprising:
receiving, using a raw data capture application, raw data via at least one of a touchscreen input device, a microphone, and an image capture device of a computerized mobile device;
transmitting, using a wireless communications interface of the computerized mobile device, the raw data to a data conversion and learning server;
receiving, by the data conversion and learning server from the computerized mobile device, the raw data;
converting, by the data conversion and learning server, the raw data into at least one searchable data object using at least one data parser;
accessing, by the data conversion and learning server, a database of a plurality of predefined data query objects;
selecting, by the data conversion and learning server, a searchable data object of the at least one searchable data object converted from the raw data;
identifying, by the data conversion and learning server, at least one predefined data query object of the plurality of predefined data query objects, based on the selected searchable data object;
formatting, by the data conversion and learning server, the selected searchable data object based on the identified at least one predefined data query object; and
storing, by the data conversion and learning server, at least a respective portion of the selected searchable data object in association with each identified at least one predefined data query object,
wherein formatting the selected searchable data object based on the identified at least one predefined data query object comprises:
generating a first interface portion of a user interface including the formatted searchable data object; and
generating a second interface portion including the raw data from which the formatted searchable data object was converted.

11. The method of claim 10, wherein converting the raw data into at least one searchable data object comprises:
selecting a text description for at least one physical object indicated in the raw data.

12. The method of claim 10, wherein converting the raw data into at least one searchable data object comprises:
identifying at least one physical object displayed in a video file of the raw data by comparing the video file to stored object image data using a video analysis parser; and
selecting a text description for the at least one identified physical object.

13. The method of claim 10, wherein converting the raw data into at least one searchable data object comprises:
identifying at least one physical object displayed in an image file of the raw data by comparing the image file to stored object image data using an image analysis parser; and
selecting a text description for the at least one identified physical object.

14. The method of claim 10, wherein converting the raw data into at least one searchable data object comprises:
identifying at least one text description in the raw data using at least one of the following:
an electronic handwriting parser, and
an optical character recognition parser.

15. The method of claim 10, wherein converting the raw data into at least one searchable data object comprises:
identifying at least one audio description in the raw data using a voice recognition parser; and
selecting a text description for the at least one audio description.

16. The method of claim 10, wherein converting the raw data into at least one searchable data object comprises:
identifying at least one barcode in the raw data using a barcode parser; and
selecting barcode information associated with the at least one barcode.

17. The method of claim 10, wherein the identified at least one predefined data query object comprises a predefined form field for an information intake process.

18. The method of claim 10, wherein identifying the at least one predefined data query object based on the selected searchable data object comprises:
comparing a first text description associated with the selected searchable data object to a respective second text description associated with each predefined data query object.

* * * * *